Figure 1:
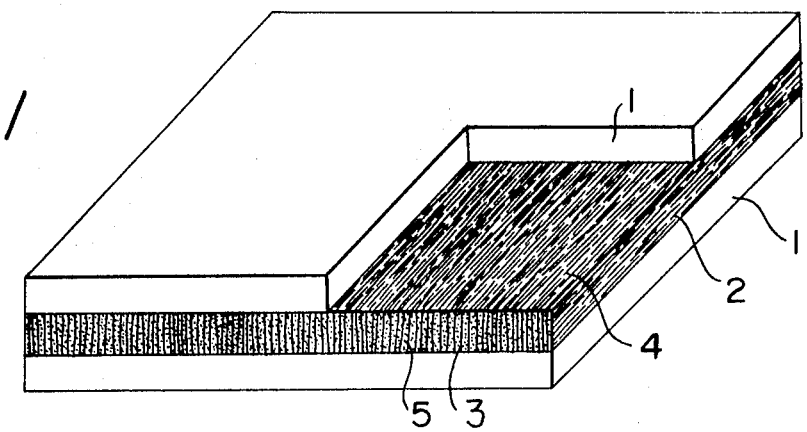

United States Patent

[11] 3,620,897

[72] Inventors Katsukiyo Tanimoto;
Tamio Urakami; Sotaro Itadani, all of
Kurashiki, Japan
[21] Appl. No. 838,502
[22] Filed July 2, 1969
[45] Patented Nov. 16, 1971
[73] Assignee Kurashiki Rayon Co., Ltd.
Kurashiki, Japan
[32] Priorities July 2, 1968
[33] Japan
[31] 43/46052; 43/56189

[54] CONVEYOR BELTS AND PROCESS FOR THEIR MANUFACTURE
17 Claims, 4 Drawing Figs.
[52] U.S. Cl..................................................... 161/154,
74/232, 156/148, 161/88, 161/155, 161/156,
198/193
[51] Int. Cl...................................................... B32b 25/10,
B65g 15/34
[50] Field of Search........................................ 161/151–156,
170; 156/137; 74/231, 232; 198/184,
193, 194

[56] References Cited
FOREIGN PATENTS
1,295 6/1907 Great Britain................ 161/151

Primary Examiner—William A. Powell
Attorney—Sherman and Shalloway

ABSTRACT: A conveyor belt consisting of a core body and rubber covers interposing said core, the core body being formed of a nonwoven sheet of staple fiber webs, the fibers constituting the nonwoven sheet being mutually entangled by needling and at least approximately 80 percent thereof being oriented in longitudinal direction of the belt by drawing of the nonwoven sheet in longitudinal direction, and the nonwoven sheet being sufficiently impregnated with an adhesive. Such conveyor belt is prepared by a process which comprises needling a web of 200–1,000 g./m.² formed of crimped and 40–120 mm. long staple fibers at a needling density of 50–250 times/cm.²; drawing the needled web in its longitudinal direction by at least 50 percent; impregnating the nonwoven sheet with an adhesive to produce a core body; and pressing rubber covers onto the top and bottom surfaces of such core body. The impregnation of the needled web with the adhesive may be conducted prior to drawing.

PATENTED NOV 16 1971 3,620,897

CONVEYOR BELTS AND PROCESS FOR THEIR MANUFACTURE

This invention relates to conveyor belts and process for their manufacture.

More particularly, the invention relates to a conveyor belt consisting of a core body and rubber covers interposing said core, the core body being formed of a nonwoven sheet of staple fiber webs, the fibers constituting the nonwoven sheet being mutually entangled by needing and at least approximately 80 percent thereof being oriented in longitudinal direction of the belt by drawing of the nonwoven sheet in longitudinal direction, and the nonwoven sheet being sufficiently impregnated with an adhesive; and also to a process for the manufacture of such a belt.

Many methods are known for the manufacture of conveyor belts of various constructions. Multiply core is employed in some of those known products, which is formed by laminating several sheets of plainwoven fabrics. A conveyor belt with a monopoly core, i.e., with a core consisting of single sheet of woven fabric, is impracticable, because it exhibits too great elongation and excessive pliability which means poor load-carrying ability. Therefore, in the known conveyor belts, the elongation, pliability, and strength are suitably adjusted by laminating several sheets of woven fabrics. However, such known structures are still deficient in that sufficiently strong bonding is hardly obtainable between the rubber covers with core, or between the sheets forming the core; that the flexibility of the belt is somewhat impaired; and that the longitudinal elongation is occasionally objectionably great. Thus improvement of conveyor belts in those respects is the demand of the industry.

Furthermore, manufacture of the belt of above-described structure requires much labor in the preparation steps of the multiply core, such as spinning, twisting, weaving, laminating and bonding, etc. Also the adhesibility to rubber covers is imparted to the woven sheets forming the core, by dipping treatment and friction treatment of rubber into the woven sheets. Thus the manufacture requires extremely long time, many steps and high production cost.

Other structure of conveyor belt with the core in which staple fibers are mixed into masticated rubber by calendering is also known. However, such belts are not only unsatisfactory in strength, but also exhibit excessively high elongation and low tear strength, because of such limitations as that the staple fiber length mixable with masticated rubber is no more than 10 mm., and the allowable amount of the fiber is no more than 10 -20 percent to the rubber. Also their joining ability to metallic tools at the ends neither is satisfactory.

We have previously proposed a conveyor belt structure with a core of nonwoven sheet prepared by needling a filamentary layer together with webs superposed on its top and bottom, from which the foregoing deficiencies have been eliminated (U.S. Pat. application Ser. No. 794,248 ). However, in said structure, numbers of preliminary steps are required for the preparation of filamentary layer, such as winding filaments onto a warping beam, uniformly spreading the filamentary tows, etc. Furthermore, the belt is still expensive due to the use of such filamentary layer. We now successfully further simplified the manufacturing steps and reduced the starting material cost by using a core of nonwoven sheet consisting of webs, while achieving the same level of performance as of the use of filamentary layer.

The main object of the present invention is to provide novel monopoly conveyor belt structure with a core of nonwoven sheet formed of staple fiber web layers.

Another object of the invention is to provide a novel conveyor belt structure having a sufficient strength and low elongation in the longitudinal direction.

A further object of the invention is to provide a conveyor belt structure exhibiting improved bonding between the core and rubber covers, resistance to flexal fatigue, impact resistance, and joining ability to metallic tools.

Still another object of the invention is to provide a novel process for the manufacture of conveyor belt consisting of simpler steps than those of conventional processes.

Other many objects and advantages of the invention will become apparent upon reading the following descriptions.

Conveyor belts are used as a combination of rubber covers and a suitable core body selected according to the purpose of use. They are generally classified into three classes of low-, medium-, and high-strength conveyor belts.

The performances required of the conventional low- and medium-strength conveyor belts with the core bodies using woven fabrics are as follows:

1. That they possess high strength in the longitudinal direction, such as 100-300 kg. per 1 cm. width of the belt. When the tension during use is approximately one tenth of the strength, the desirable elongation in said direction is no more than 2 percent.
2. That the adherability of the core with rubber cover is at least 7 kg. per 2.5 cm. width.
3. That they possess high resistance to flexal fatigue. They should be able to resist the flexing of 100,000 times in the later described flexing test (cf. later given examples).
4. That the two ends of the belt can be easily joined. While normally lacing is used for this purpose, the bonding efficiency should be at least 30 percent to the strength in longitudinal direction.
5. That they possess impact strength.
6. That they exhibit little fatigue during use. That is, they should exhibit little change in core strength and little aging in the adherability with rubber cover.
7. That the foregoing performances should show little deterioration under wet conditions.

A conveyor belt of this invention comprises a monopoly core body of nonwoven sheet composed of staple fiber card or random web layers. And, the staple fibers constituting the webs are mutually entangled or intertwined by needling to form an integral nonwoven sheet. The sheet is longitudinally elongated after the needling, whereby at least approximately 80 percent of the staple fiber component is longitudinally oriented. The sheet is furthermore sufficiently impregnated with an adhesive.

In the present specification and claims, the term "nonwoven sheet" is used to mean that which is formed by needling staple fiber webs, and elongating the same in longitudinal direction, and "core" or "core body", to mean the nonwoven sheet impregnated with an adhesive.

Figure 2:
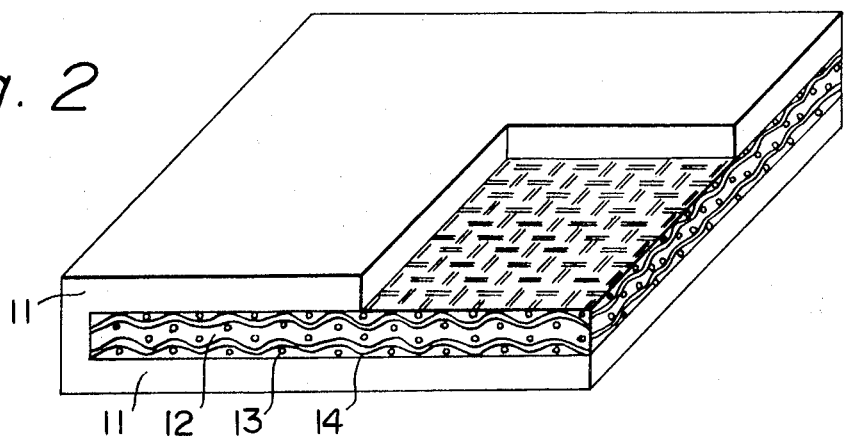
Figure 3:
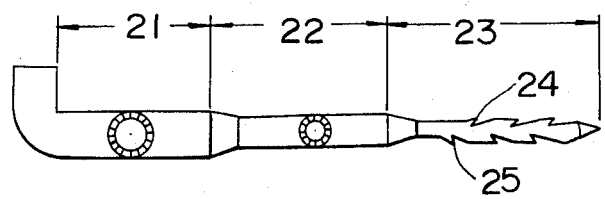
Figure 4:
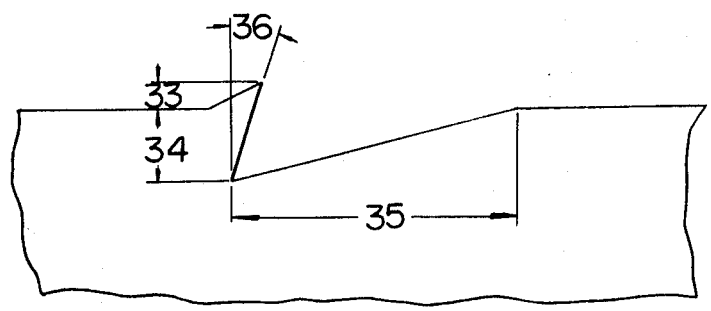

Among the attached drawings
FIG. 1 shows the horizontal section of the conveyor belt of this invention with a part cut away;
FIG. 2 shows the horizontal section of conventional conveyor belt with a part cut away;
FIG. 3 is a plan view of the needle employed for needling the web layers in accordance with the invention; and
FIG. 4 is an enlarged plan view of barb 25 of the needle.

Referring to Fig. 1, 1 denotes rubber covers, 2 denotes web layers (nonwoven sheet), 3 shows the state of mutually entangled staple fibers, 4 shows the state of oriented staple fibers, and 5 denotes the filled adhesive. The rubber covers 1 and nonwoven sheet 2 are adhered by pressing.

Referring now to Fig. 2, 11 denotes rubber covers, 12 denotes the core formed of woven fabrics, 13 denotes woof and 14, warp. The core 12 is composed of multiplies of laminated several woven sheets, which is dipped with an adhesive. The rubber covers 11 and the core 12 are adhered by pressing.

Referring to Fig. 3, 33 is the keep-up height, 34 is the throat depth, 35 is the throat length, and 36, the undercut angle.

As the staple fibers to form the webs, those of synthetic fibers such as polyesters, polyvinyl alcohol, polypropylene, polyamide, polyacrylic type, etc. can be used.

The preferred staple fiber length ranges 40–120 mm., 45–90 mm. being particularly effective. When it is shorter than 40 mm., web-formation becomes difficult, and stable drawing of the webs after needling cannot be achieved, since during the drawing slipping tends to occur between the fibers, causing the fibers to fall off. Also the entanglement among the fibers is loosened to result in unsatisfactory strength in the longitudinal direction of the conveyor belt. Also when the staple fiber length exceeds 120 mm., again web-formation is rendered difficult, and if after all an integral web is obtained, appreciable increase in belt strength cannot be expected.

The fibers forming the web must be crimped. Noncrimped fibers can hardly form an integral web. The crimping needs not be permanently set, but it is sufficient for the purpose so long as the fibers have crimps during the web-formation. The crimping can be achieved by any of the means known per se, such as dipping the fibers in hot water or an aqueous solution containing a swelling agent to develop crimps therein, or passing the fibers between grooved rolls to impart crimps thereto, or feeding the fibers into a stuffing box, etc.

The stable fibers may be prepared by cutting crimped filaments, or crimping the cut filaments.

The size of the fibers may range from 1-10 deniers. Fibers of diameters greater than 10 deniers show insufficient mutual entanglement and consequently, unsatisfactory strength. Whereas, fine denier fibers such as less than 1 denier in diameter cannot form a uniform and soft web. Preferred fiber size ranges 3-8 deniers.

The nonwoven sheet employed in this invention is required to have a thickness ranging 2-10 mm., preferably 3-8 mm. With a sheet thickness less than 2 mm., the belt using it as the monopoly core fails to show sufficient strength. When the thickness exceeds 10 mm., on the other hand, rigidity of the belt increases to reduce its load-carrying ability. The weight of the nonwoven sheet ranges 300-1,500 g./m.$^2$, preferably 400-1,000 g./m.$^2$. When the sheet weighs less than 300 g./m.$^2$, sufficient belt strength cannot be obtained, and when it is heavier than 1,500 g./m.$^2$, good impregnation of adhesive therethrough cannot be expected, and the adhesion between the sheet and rubber covers is impaired. Thus the belt's resistance to flexal fatigue is deteriorated and rigidity increases. Incidentally, the final thickness of the nonwoven sheet depends on the pressure for pressing the rubber covers onto the sheet.

Such nonwoven sheet of the described thickness and weight can be obtained by needling and drawing a web of 10-60 mm. in thickness, preferably 15-45 mm., and 200-1,000 g./m.$^2$ in weight, preferably 300-800 g./m.$^2$.

The web can be formed with a card webber or random webber. The web may be formed or more than one type of fibers, or may be formed by laminating webs of different fibers.

In the nonwoven sheet of this invention, the constituent staple fibers are required to be sufficiently intertwining with each other. The intertwining can be achieved by needling the web or webs. The needling density required for this purpose ranges 50-250 times/cm.$^2$, preferably 70-200 times/cm.$^2$. When the needling density is less than 50 times/cm.$^2$, the conveyor belt prepared therefrom tends to exhibit poor bending strength, and particularly shows appreciable strength reduction during the longitudinal drawing of the needled web to orient the constituent fibers. This is presumably because the fibers slip during the drawing, to deform the fiber shape intertwined by needling. Also when the needling density is thicker than 250 times/cm.$^2$, the longitudinal strength of the conveyor belt is reduced and the elongation also is increased. Furthermore the longitudinal drawing of the web becomes difficult, and consequently the constituent fibers cannot be satisfactorily oriented in the longitudinal direction. The needling density is also dependent, to a certain extent, on the size and shape of the needle employed. The needle size normally ranges 0.5-1.3 mm., preferably 0.6-0.8 mm., in diameter, and the barb may be triangular, round, or square. The undercut angle of the barb is preferably 0°-70°, but the angles outside the preferred range are useable so far as a sufficient intertwining property can be imparted to the webs. The preferred keep-up height of the barb ranges 0.1-0.2 mm., while keep-up heights other than the preferred range can be employed so far as sufficient intertwining property can be imparted to the web layer, and the fiber breakage is not objectionably increased.

The nonwoven sheet of this invention is formed by further drawing the needled web in longitudinal direction to sufficiently orient the constituent fibers in the longitudinal direction. It is required that at least 80 percent, preferably not less than 80 percent, of the constituent fibers must be longitudinally oriented. Such oriented structure of the fibers can be obtained by longitudinally drawing the needled web to the maximum possible extent. The drawing is achieved by at least 50 percent to the original length of the needled web, preferably by at least 80 percent, to below the breaking point of the web. Suitable draw ratio is also to some extent dependent on the needling density.

The nonwoven sheet thus imparted with dimensional stability, intertwining property, and fiber orientation, by the needling and drawing, is then impregnated with an adhesive.

The adhesive is employed in accordance with the theory of adhesive, i.e., it is preferred to use an adhesive containing a component having a high affinity to the rubber cover, particularly a component identical with the rubber cover. For example, such combinations as natural rubber or SBR rubber cover-natural rubber, SBR rubber, vinyl-pyridine rubber or latices thereof; neoplene rubber cover-neoplene rubber or latex thereof; butyl rubber cover-butyl rubber or latex thereof; are preferred. When the rubber cover is of natural rubber, SBR rubber, or mixtures thereof, any of natural, SBR, and vinylpyridine rubbers or latices thereof can be used as the adhesive, at a suitable blend ratio. When the rubber cover consists of more than one components in the above-mentioned combinations, it is preferred to use more than one of the corresponding adhesive components. Vinylpyridine rubber-type adhesive is employed when particularly strong bonding is required between the rubber cover and the core. Whereas, in most cases rubber covers of conveyor belts are made mainly of natural, SBR, or vinylpyridine rubber, or latices thereof.

The adhesive must be sufficiently infiltrating into the nonwoven sheet. The adhesive pickup by the infiltration of the nonwoven sheet is at least 50 wt. percent, preferably 80 wt. percent, to the nonwoven sheet. When the pickup is less than 50 wt. percent, the interfiber adhesion is insufficient, and the longitudinal strength and flexibility of the belt is objectionably impaired.

The ideal state of distribution of the adhesive in the nonwoven sheet is such that the adhesive is cross-sectionally uniformly distributed, and every monofiber constituting the nonwoven sheet is sufficiently fixed. Upon mutual adhesion and fixing of the monofibers, the core body is imparted with strength and flexibilty. Strong inter-fiber adhesion can be obtained by the use of a component which increases the affinity between the rubber component in the adhesive and the fibers (fiber-philic component), such as well-known isocyanate compounds, resorcin-formalin resin, epoxy compounds, ethylene-urea compounds, ethylene-imine compounds, phenolic resin, etc. Rubber latex-resorcin-formalin resin adhesives or rubber component-isocyanate compound adhesives, such as triphenylmethane-4,4,4-triisocyanate adhesive, are particularly preferred. Specific content of the fiber-philic component in any adhesive composition is determined in accordance with the materials of rubber cover and the fibers, while normally it is no more than 25 wt. percent to the rubber component, preferably no more than 15 wt. percent. The content is preferably kept to the allowable minimum, for improving the flexibility of conveyor belt.

With a conveyor belt of the invention, it is not always necessary to mix a fiber-philic component into the adhesive composition, due to the anchoring effect of its specific construction. In the known conveyor belts containing core body of woven sheets, if an adhesive composition containing no fiberphilic component is used for bonding rubber cover with the woven sheets, the peel strength is drastically reduced. Whereas, the conveyor belt of the invention, even when an adhesive containing no fiber-philic component is used to bond the rubber over with core body by pressing, the peel strength of practical level is retained. Thus in the convey belts of the invention, even when there is no cheap and suitable fiber-philic component to the specific web fiber employed, adhesion of rubber cover with the core securing practicable level of peel strength can be obtained by the use of an adhesive composed of the rubber component alone.

However, in case an adhesive containing a fiber-philic component is used, the weight ratio of the component to the rubber component must be within the range specified in the above. Otherwise, the interfibrous fixing advances excessively and the flexibility of the belt is remarkably impaired.

The adhesive can be used in the form of a solution in a solvent, such as hydrocarbon solvents including gasoline, hexane, and petroleum ether; benzene solvents including benzene, toluene and xylene; ketone solvents such as methyl ethyl ketone and diethyl ketone; or in rubber-latex form. When a fiber-philic component is added as one component of the adhesive, isocyanate compounds are preferred for organic solvent type adhesive compositions, and resorcin-formalin resins are preferred for latex type adhesive compositions. In case of dissolving rubber in organic solvent, it is preferred that the rubber should be fully masticated.

It is of course permissible to blend with the adhesive composition, various reinforcing agent, vulcanization agent, and additives, such as carbon black, sulfur, zinc flower, stearic acid, calcium carbonate, processing oil, etc., and/or various promotor and antioxidant, in accordance with the accepted practice.

Unnecessarily high viscosity of the adhesive solution should be avoided, since such will prevent uniform infiltration of the adhesive into the nonwoven sheet. Appropriate viscosity is dependent on thickness and density of the nonwoven sheet, but normally is not higher than 150 p.s.i.g., preferably not higher than 100 p.s.i.g. When the nonwoven sheet is relatively thick (800 g./m.$^2$ or above in weight), the viscosity of adhesive solution is preferably not higher than 100 p.s.i.g.

The conveyor belt of the invention is manufactured, on the principle, in accordance with ordinary method. However, the manufacture of the conveyor belt of this invention is different from that of conventional conveyor belts in the following point.

In the manufacture of known conveyor belts, woven sheets are used as the core. Accordingly, the woven sheets must be subjected to a rubberizing step by friction in advance. In contrast, no rubberizing step is necessary in the process of this invention. Furthermore, the preparation of core for the conveyor belt of the invention is achieved through much less number of steps, compared with the manufacture of known woven-sheet multiply core of conventional conveyor belt.

The process for the manufacture of conveyor belt of this invention comprises needling more staple fiber webs, converting the needled web to nonwoven sheet by sufficiently drawing the same in longitudinal direction, and impregnating the nonwoven sheet with an adhesive to form the core body; or impregnating the needled web with an adhesive and drawing the same sufficiently in longitudinal direction; and pressing rubber covers onto the top and bottom of the core body.

First the web formed in a card webber or random webber is supplied to a needle locker to be needled.

The needled web may be then longitudinally drawn or stretched. This drawing is effected with holding rollers of different peripheral speeds. It is preferred to conduct this drawing gradually with plural holding rollers. This drawing is conducted for finally orienting the staple fibers constituting the nonwoven sheet in longitudinal direction. With this drawing, the thickness and width of the needled web are reduced, and length and density are increased. The correlation between this drawing and the degree of orientation of the staple fibers forming the nonwoven sheet differs depending on such factors as needling density, fiber length and size. In order to orient at least 80 percent of the fibers in the sheet, it is required to draw the needled web at a sufficiently high ratio to the original web length. Particularly preferred draw ratio is not less than 80 percent. Thus drawn web may be dimensionally stabilized by, for example, a heat treatment.

Thus formed nonwoven sheet is then impregnated with an adhesive to pick up sufficient amount of the adhesive. Thus impregnated nonwoven sheet is dried, and if necessary, subsequently baked for 2–10 minutes at 100°–180° C. before serving as the core body in accordance with the subject invention. The impregnation of the core body with the adhesive may be effected with the needled but undrawn web. In that case, it is recommendable to draw the adhesive-impregnated web before the adhesive is cured or hardened.

Upon pressing rubber covers onto the top and bottom of the core body with a pressure of 5–30 kg./cm.$^2$, normally 20 kg./cm.$^2$, at 140°–150° C., the conveyor belt of this invention is obtained.

In the foregoing process of manufacture, the conditions of staple fibers, web, needling, etc., and the particulars of conveyor belts, are same to those described in details as to the conveyor belt of the invention.

The conveyor belt of the invention thus possesses novel construction and excellent performance. That is, the core body of the conveyor belt of this invention must meet the following requirements:

1. That it is formed of webs of crimped staple fiber,
2. That the webs are needled to form a felt in which the constituent fibers are intertwined,
3. That the needled felt is sufficiently longitudinally drawn or stretched to form a nonwoven sheet in which the greater part of the constituent fibers are oriented in longitudinal direction, and
4. That the nonwoven sheet is impregnated with an adhesive.

The numerical or physical limitations on such structure are as specified in the foregoing.

The critical nature of each step for manufacturing the conveyor belt of this invention can be summarized as follows:

When unneedled web is used as the core body, the core lacks dimensional stability and has low strength. The conveyor belt prepared therefrom exhibits unsatisfactory strength and elongation in longitudinal direction, and poor resistance to flexal fatigue and low rubber peel strength. Also a conveyor belt with a needled but not longitudinally drawn web as the core shows low longitudinal strength and excessive elongation. Its performance is by no means satisfactory. Furthermore, when a nonwoven sheet not impregnated with an adhesive is used as the core, the resulting conveyor belt has drastically impaired bending strength and rubber peel strength, and becomes useless for practical purpose. Besides the foregoing, if any of the conditions such as fiber length, adhesive pickup, etc., goes out of the specified ranges of the invention, the conveyor belt of excellent strength and elongation, bending strength, and rubber peel strength cannot be obtained.

The advantages of the conveyor belts of this invention can be summarized as follows:

1. While the known conveyor belt with monopoly woven fabric as the core has a two great elongation and pliability for practical use, the conveyor belt of this invention shows satisfactory performance with the monopoly core, because the core has suitable hardness and thickness.
2. Therefore, the belt of the invention the pulley thinner and lighter in weight compared with the belt with a core of laminated, several layers of woven fabric. Consequently the former shows good hold of pulley, even when the pulley diameter is small.
3. While strong adherability with rubber is an essential requirement for the multiply woven fabric core, the core body in accordance with the invention exhibits excellent adherability with rubber, because it is monopoly and formed of webs as the starting material.
4. In case of conveyor belt with woven core, occasionally braker is used separately for protecting the woven core, particularly from impact, etc. Such is entirely unnecessary for the conveyor belt of this invention.
5. In case of conveyor belts with woven core, the core is prepared from fibers through numbers of steps with much labor such as spinning, twisting, and weaving. Furthermore, the core is subjected to dipping of adhesive agent such as resorcin-formalin latex, and rubber friction, and thereafter pressed with rubber cover.

Whereas, the conveyor belt of the invention can be manufactured by remarkably shortened steps such as forming webs, needling and drawing the same to convert it to a nonwoven sheet, impregnating the sheet with an adhesive, and pressing thereto rubber covers. The conveyor belts of the invention can furthermore be manufactured continuously, and the production cost thereof is low.

6. The object of the invention being provision of the conveyor belt with a monopoly core, multiply core may also be formed by application of the subject process.

7. The conveyor belt of the invention exhibits satisfactory performance without a reinforcing agent of the web such as filaments, etc. Thus the preliminary steps for the preparation of filamentary layer, such as warping, spreading, etc., can be omitted, and the production cost as well as material cost can be reduced.

Hereinafter the invention will be explained with reference to the working examples.

EXAMPLE 1

A 450 g./m.$^2$ random web was formed from crimped polyvinyl alcohol synthetic fiber (6 deniers in size, 60 mm. in length, 6 g./dr.×14.5 percent in strength-elongation) and needled at a density of 150 times/cm.$^2$, and drawn by 100 percent in longitudinal direction. Thus prepared nonwoven sheet had an increased weight of 680 g./m.$^2$.

The nonwoven sheet was impregnated with a rubber-solvent paste of the following composition and dried.

RUBBER-SOLVENT PASTE COMPOSITION

| Component | Part by weight |
| --- | --- |
| Natural rubber | 100 |
| Carbon black | 50 |
| Zinc flower | 5 |
| Stearic acid | 2.8 |
| Sulfur | 2.2 |
| Promotor | 1 |
| Antioxidant | 1 |

The adhesive pickup of the nonwoven sheet was 120 percent.

On the top and bottom of thus obtained core body, rubber covers of 1.6 mm. in thickness and of the following composition was pressed at 150° C. for 20 minutes. Whereupon the core body became 1 mm. in thickness.

COVER RUBBER COMPOSITION

| Component | Part by weight |
| --- | --- |
| Natural rubber | 40 |
| Styrene-butadiene rubber | 60 |
| Carbon black | 50 |
| Zinc flower | 5 |
| Stearic acid | 2.8 |
| Sulfur | 2.2 |
| Promotor | 1 |
| Antioxidant | 1 |

Thus obtained conveyor belt was subjected to a flexing test by a Scott's flexing tester (manufactured by Uejima Seisakusho of Japan). The belt withstood flexing of 200,000 times before separation of core from the rubber covers was observed, exhibiting a strength-elongation of 220 kg./cm.×18.4 percent, and a rubber peel strength of 13.5 kg./width of 2.5 cm.

The measurements of strength-elongation, flexibility and rubber peel strength were performed as follows:

Strength-elongation

A 3-cm. wide and 50-cm. long piece was cut off from the sample conveyor belt, and pulled at a rate of 5 cm./min., with a clutching interval of 20 cm. Thus measured value, for example, 220 kg./cm.×18.4 percent of Run No. 1, denotes that strength per width of 1 cm. of the belt was 220 kg. and elongation of the belt at that time was 18.4 percent as compared with the original length. The strength-elongation was measured by a general tensile tester (manufactured by Shimazu Seisakusho of Japan, Autograph IS-2000). The elongation was measured based on the elongation ratio of the length between two marks noted on the piece.

Flexibility

The test was performed with Scott's flexing tester (manufactured by Uejima Seisakusho, Japan).

Test Specimen: 2.5 cm. in width and 35 cm. in length

The test piece was mounted on a grooved wheel of 25 cm. in diameter, and its two ends were fixed. The angle of contact of the test piece with the circumference of the grooved wheel was 135°. Then the piece was caused to perform repetitive, continuous bending along the circumference of the grooved wheel, at a reciprocation rate of 170 times per minute over a reciprocatory distance of 134 mm., under a load of 50 kg.

The number of flexing at which an abnormality was observed in the test specimen was recorded as the norm of flexing performance.

Rubber peel strength

Test specimen: 2.5 cm. in width and 20 cm. in length

The rubber cover was peeled off from the core of the specimen by a short distance, and the tips of the two were interposed between clamps of a belt peel tester and pulled to each opposite direction at a rate of 5 cm./min. The tensile load under which the peeling distance reached 7.5 cm. was recorded by a recorder and the rubber peel strength was calculated therefrom. The measured values showed a wavy graph when plotted, and arithmetic mean of each crest point of said wavy portion of the curve was calculated, which was presented as the peel strength.

The measuring was done using a belt peel tester (manufactured by Uejima Seisakusho, Japan).

EXAMPLE 2

A 200 g./m.$^2$ of random web was formed from crimped polyvinyl alcohol synthetic fiber (8 deniers in size, 89 mm. in length, 5 g./dr.×16.3 percent in strength-elongation), which was needled at a density of 100 times/cm.$^2$, and drawn by 120 percent in the longitudinal direction. Thus prepared nonwoven sheet had a weight of 330 g./m.$^2$, and a thickness of 3 mm.

This nonwoven sheet was impregnated with the same rubber paste as used in example 1, dried. The adhesive pickup was 140 percent.

A conveyor belt was prepared from the core body thus prepared, by pressing rubber covers thereto in the manner similar to example 1. This monopoly belt had a strength-elongation of 130 kg./cm.×20.1 percent, resistance to flexal fatigue of 200,000 times, and the peel strength of the core from the rubber cover was 12.5 kg./width of 2.5 cm.

example 3

The nonwoven sheet prepared similarly to that of example 1 was impregnated with resorcin-formalin latex (RFL), and baked at 160° C. for 4 minutes. Thus prepared core body had a RFL pickup of 65 percent.

The RFL was prepared as follows:

The molar ratio of R/F was 1/1; RF concentration was 6 percent, and 4 percent of caustic soda to the R was added. The adhesive composition was allowed to stand for 6 hours at an ambient temperature of 20° C., to age RF in the latex. To the resulting aqueous solution of Rf resin, a latex was added at a weight ratio of 15/100. The latex was that obtained by mixing styrene-butadiene copolymer latex, Nipol L×102, with vinyl-pyridine-styrene-butadiene copolymer latex, Hycar 2518 FS, at a weight ratio of 3:1. (Both of the two latices are the products of Nippon Geon Company.) After the addition of the latex, the composition was allowed to stand for 16 hours at 20° C. to complete the aging.

Onto the two surfaces of this core body, each 1.6-mm. thick rubber covers of the following composition were pressed at 150° C. for 20 minutes. Thus a conveyor belt was obtained.

COMPOSITION OF RUBBER COVER

| Component | Part by weight |
| --- | --- |
| Natural rubber | 40 |
| Styrene-butadiene rubber | 60 |
| Carbon black | 50 |
| Zinc flower | 8 |
| Stearic acid | 2.8 |
| Sulfur | 2.2 |
| Promotor | 1 |
| Antioxidant | 1 |

The performances of this conveyor belt are shown as Run No. 1 in table 1.

In the same table, Run Nos. 2 through 7 are the Controls, those conveyor belts being prepared under identical conditions with those employed in this example, except the item given in the table as to each run, which was outside the scope of the invention. Their performances are also given in the same table in comparison with those of the belt of this invention. The strength-elongation, flexibility, and rubber peel strength were determined by the methods employed in example 1.

TABLE 1

| Run No. | Conveyor belt | Longitudinal strength elongation (kg./cm. x percent) | Flexibility (times) | Peel strength (kg. 2.5 cm.) |
| --- | --- | --- | --- | --- |
| 1 | Product of Example 3 | 231 x 16.6 | 200,000 | 18.5 |
| 2 | Web-forming staple fibers were 4 dr. x 30 mm. in size. | (1) | (1) | (1) |
| 3 | Needling density of the web was 35 times/cm.² | 235 x 16.1 | 40,000 | 16.5 |
| 4 | Needling density of the web was 280 times/cm.² | 128 x 23.4 | 200,000 | 18.3 |
| 5 | Needled web was drawn by 40%. | 132 x 26.5 | 180,000 | 17.8 |
| 6 | No adhesive (RFL) treatment was given. | 85 x 20.7 | 15,000 | 9.2 |
| 7 | Adhesive pick-up (RFL) was 20%. | 135 x 18.1 | 50,000 | 14.4 |

¹ Uniform web was hardly formed, which could not be drawn after needling.

EXAMPLE 4

A conveyor belt of the invention was prepared similarly to example 3, except that RFL was replaced by a SBR latex of the following composition (Nipol LX 102, product of Nippon Zeon Co., Japan), and the core was baked at 150° C. for 5 minutes. The adhesive pickup was 105 percent.

This conveyor belt had a longitudinal strength elongation of 218 kg./cm.×18 percent, a flexibility of 200,000 times, and a rubber peel strength of 11.6 kg./2.5 cm. The measuring methods employed were same to those of example 3.

EXAMPLE 5

Conveyor belts were prepared similarly to example 3, except that the staple fibers used as the web material were varied in each run as indicated in table II. Performances of each product were measured similarly to example 3, with the results as given also in table II.

TABLE II

| Web material | Fiber size (dr. x mm.) | Longitudinal strength-elongation (kg./cm. x percent) | Flexibility (times) | Rubber peel strength (kg./2.5 cm.) |
| --- | --- | --- | --- | --- |
| Polyester | 3 x 51 | 218 x 16.1 | 200,000 | 11.3 |
| Polypropylene | 3 x 51 | 205 x 18.5 | 200,000 | 9.8 |
| Polyamide | 3 x 51 | 234 x 21.2 | 200,000 | 17.4 |

EXAMPLE 6

1. A conveyor belt of the invention was prepared similarly to example 3. The weight of core body after RFL treatment was 1,120 g./m.². Whereas, the weight of the conveyor belt after pressing rubber covers to the core body was 4,970 g./m.². The belt thickness was 4.2 mm.

2. Separately, plain woven canvas of the structure $$\frac{1200 \text{ d}/3 \times 840 \text{ d}/2}{45 \text{ strands} \times 27 \text{ strands (5 cm. in width)}},$$

and of the weight 505 g./m.², was prepared from polyvinyl alcohol synthetic filaments of 1,200 dr./200 f. (the strength-elongation of the yarn : 8.4 kg./cm.×13 percent) as the woof and nylon filaments of 840 dr./160 f. (the strength-elongation of the yarn: 6.4 kg./cm.×22.5 percent) as the warp, and using mono-ply of the plain woven sheet as the core, a conveyor belt was prepared in the manner described in example 3. The resultant belt was 4,400 g./m.² in weight and 4.1 mm. in thickness.

3. Separately, a woven fabric of polyvinyl alcohol synthetic spun fiber (2 dr.×51 mm. : the strength-elongation of the single fiber = 5.5 g./dr.×14.5 percent) of the structure $$\frac{10/4 \times 10/4}{45 \text{ strands} \times 25 \text{ strands (5 cm. in width)}}$$

and of the weight 450 g./m.², was treated with RFL adhesive in the manner described in example 3. Then rubber of the same composition as of the cover rubber was rubbed into the woven sheet. Four sheets of thus obtained woven fabric were laminated, and bonded with the rubber cover by pressing as described had example 3. Thus a conveyor belt with the core formed of four-ply woven sheet was manufactured, which had a weight of 6,680 g./m.², and a thickness of 6.0 mm.

As to the foregoing three conveyor belts, longitudinal strength-elongation, elongation under tension corresponding to one tenth of belt strength, flexibility, metallic tool joining efficiency, rubber peel strength, impact strength and fatigue property were measured, with the results as given in table III.

The longitudinal strength-elongation, flexibility, and rubber peel strength were measured by the methods described in example 1, except that the flexibility test was conducted by employing a grooved wheel 35 mm. in diameter. Other properties were measured as follows:

Elongation under tension corresponding to one tenth of belt strength

It was measured in accordance with the same process of measuring longitudinal strength-elongation except tension corresponding to one tenth of the belt strength was imposed on the belt. Normally, a conveyor belt is made to run while being imposed with tension corresponding to one-tenth to one sixteenth. Therefore, said elongation under tension corresponding to one tenth of belt strength becomes one important characteristics of the belt.

Metallic tool joining efficiency

The two 4.5-cm. wide and 15-cm. long sample conveyor belts were joined with No. 27 lacing (the shape of the lacing was that defined in JIS B 1851), and the joint portion was broken by exertion of tension as in the strength-elongation test same as in example 1 except the distance between clamps was 20 cm. and the tensile speed was 10 cm./min. The ratio between the breaking strength and the strength of the sample belt was recorded as the metallic tool joining efficiency.

Impact strength

The sample was fixed at both ends, and subjected to a tension corresponding to one-twelfth of the strength of sample belt. To the sample then 9 kg.-m. per blow of impact energy was exerted with an iron piece having a 3-mm. long blade, totaling 500 blows. The strength of the belt measured before and after the impact was expressed by a percentile value.

Fatigue Resistance

A 10-cm. wide and 4-m. long sample belt was caused to run between two pulleys of 30 cm. in diameter under the following conditions, and the strength variation before and after the running was expressed by a percentile value:

| | |
|---|---|
| Belt tension | 1/12 of belt strength |
| Running velocity | 1,200 m./min. |
| Running period | 2 months. |

Properties of conveyor belts obtained in accordance with the invention under the conditions specified in table IV below are shown in table IV' below. For comparison sake, in table V' below there are shown properties of conveyor belts prepared under the conditions outside the scope of the invention, which are described in table V below where the conditions marked by * are outside the scope of the invention. Examples and controls in tables IV, IV', V and V' overlap partially some of preceding examples.

TABLE III

| | Longitudinal strength-elongation (kg./cm. x percent) | Elongation[1] (percent) | Flexibility (thousand times) | Metallic tool joining efficiency (percent) | Rubber peel strength (kg./2.5 cm.) | Impact strength (percent) | Fatigue resistance (percent) |
|---|---|---|---|---|---|---|---|
| Conveyor belt of the invention | 231 x 16.6 | 0.4 | 500 | 48 | 18.5 | 90.8 | 85.1 |
| Conveyor belt with monoply, woven core | 207 x 20.6 | 3.1 | 500 | 34 | 15.4 | 38.3 | 89.1 |
| Conveyor belt with four-ply, woven core | 221 x 20.1 | 1.0 | 280 | 30 | 14.2 | 53.1 | 70.5 |

[1] Under tension corresponding to 1/10 of belt strength.

TABLE IV

| | | Short fiber | | | Web | | |
|---|---|---|---|---|---|---|---|
| | Material | Length (mm.) | Size (dr.) | Strength-elongation (kg./cm. percent) | Weight (g./m.²) | Thickness (mm.) | Needling (times/cm.²) |
| Examples: | | | | | | | |
| I (Example 3, Run Number 3) | Polyvinyl alcohol | 60 | 6 | 6.2 x 14.5 | 450 | 23.6 | 150 |
| II | do | 60 | 6 | 6.2 x 14.5 | 490 | 25.7 | 150 |
| III | do | 60 | 6 | 6.2 x 14.5 | 550 | 28.8 | 150 |
| IV | do | 60 | 6 | 6.2 x 14.5 | 520 | 27.3 | 220 |
| V | do | 60 | 6 | 6.2 x 14.5 | 430 | 22.5 | 100 |
| VI (Example 4) | do | 60 | 6 | 6.2 x 14.5 | 450 | 23.6 | 150 |
| VII (Example 1) | do | 60 | 6 | 6.2 x 14.5 | 450 | 23.6 | 150 |
| VIII (Example 5) | Polyester | 51 | 3 | 6.1 x 16.2 | 450 | 24.1 | 150 |
| IX (Example 5) | Polypropylene | 51 | 3 | 5.9 x 18.5 | 450 | 23.2 | 150 |
| X (Example 5) | Polyamide | 51 | 3 | 6.8 x 22.3 | 450 | 23.5 | 150 |
| XI (Example 7)[1] | Polyvinyl alcohol | 60 | 6 | 6.2 x 14.5 | 520 | 27.5 | 150 |

| | Non-woven sheet | | | | Adhesives | | Core | |
|---|---|---|---|---|---|---|---|---|
| | Elongation (percent) | Orientation (percent) | Weight (g./m.²) | Thickness (mm.) | Component | Pickup (percent) | Weight (g./m.²) | (Thickness) (mm.) |
| Examples: | | | | | | | | |
| I (Example 3, Run Number 3) | 100 | 92 | 680 | 3.6 | RFL | 65 | 1,120 | (3.2) |
| II | 80 | 86 | 680 | 3.6 | RFL | 65 | 1,120 | (3.2) |
| III | 60 | 81 | 680 | 3.6 | RFL | 65 | 1,120 | (3.2) |
| IV | 65 | 80 | 680 | 3.5 | RFL | 65 | 1,120 | (3.2) |
| V | 105 | 93 | 680 | 3.7 | RFL | 65 | 1,120 | (3.2) |
| VI (Example 4) | 100 | 92 | 680 | 3.6 | SBR latex | 105 | 1,390 | (3.3) |
| VII (Example 1) | 100 | 92 | 680 | 3.6 | Rubber adhesive | 120 | 1,500 | (3.3) |
| VIII (Example 5) | 100 | 89 | 680 | 3.7 | RFL | 65 | 1,120 | (3.4) |
| IX (Example 5) | 100 | 91 | 680 | 3.6 | RFL | 65 | 1,120 | (3.4) |
| X (Example 5) | 100 | 90 | 680 | 3.6 | RFL | 65 | 1,120 | (3.4) |
| XI (Example 7)[1] | 74 | 84 | 680 | 3.9 | RFL | 65 | 1,120 | (3.2) |

[1] Stretch after bonding.

TABLE IV'.—BELT

| | Thickness (mm.) | Weight (g./m.²) | Longitudinal strength-elongation (kg./cm., percent) | Elongation,[1] percent | Flexibility (10 thousand times) | Metallic tool joining efficiency, percent | Rubber peel strength (kg./2.5 cm.) | Impact strength, percent | Fatigue resistance, percent |
|---|---|---|---|---|---|---|---|---|---|
| Examples: | | | | | | | | | |
| I (Example 3, Run Number 3) | 4.2 | 4,970 | 231 x 16.6 | 0.4 | 20< | 48 | 18.5 | 90.8 | 85.1 |
| II | 4.2 | 4,970 | 203 x 18.0 | 0.6 | 20< | 51 | 18.6 | | |
| III | 4.2 | 4,970 | 171 x 21.5 | 1.2 | 20< | 54 | 18.0 | | |
| IV | 4.2 | 4,970 | 173 x 20.4 | 0.9 | 20< | 52 | 18.1 | | |
| V | 4.2 | 4,970 | 240 x 16.2 | 0.4 | 16 | 44 | 18.0 | | |
| VI (Example 4) | 4.4 | 5,240 | 218 x 18.0 | 0.4 | 20< | 46 | 11.6 | | |
| VII (Example 1) | 4.7 | 5,350 | 220 x 18.4 | 0.4 | 20< | 45 | 13.5 | | |
| VIII (Example 5) | 4.2 | 4,970 | 218 x 16.1 | 0.4 | 20< | 49 | 11.3 | | |
| IX (Example 5) | 4.2 | 4,970 | 205 x 18.5 | 0.5 | 20< | 52 | 9.8 | | |
| X (Example 5) | 4.2 | 4,970 | 234 x 21.2 | 0.6 | 20< | 50 | 17.4 | | |
| XI (Example 7) | 4.2 | 4,970 | 191 x 20.7 | 0.8 | 20< | 52 | 17.4 | | |

[1] 1/10 of belt strength.

TABLE V

| | Short fiber | | | | Web | | |
|---|---|---|---|---|---|---|---|
| | Material | Length (mm.) | Size (dr.) | Strength-elongation (kg/cm, percent) | Weight (g./m.$^2$) | Thickness (mm.) | Needling (times/cm.$^2$) |
| Controls: | | | | | | | |
| I | Polyvinyl alcohol | 60 | 6 | 6.2 x 14.5 | *155 | 9.1 | 150 |
| II | do | 60 | 6 | 6.2 x 14.5 | *1,450 | 67.5 | 150 |
| III Example number 3, Run number 3 | do | 60 | 6 | 6.2 x 14.5 | 415 | 21.8 | *35 |
| IV Example number 3, Run number 4 | do | 60 | 6 | 6.2 x 14.5 | 580 | 31.0 | *280 |
| V Example number 3, Run number 5 | do | 60 | 6 | 6.2 x 14.5 | 610 | 32.0 | 150 |
| VI Example number 3, Run number 7 | do | 60 | 6 | 6.2 x 14.5 | 450 | 23.6 | 150 |
| VII Example number 6 | (¹) | (¹) | (¹) | (¹) | (¹) | (¹) | (¹) |
| VIII Example number 6 | (²) | (²) | (²) | (²) | (²) | (²) | (²) |

| | Non-woven sheet | | | | Adhesives | | Core | |
|---|---|---|---|---|---|---|---|---|
| | Elongation (percent) | Orientation (percent) | Weight (g./m.$^2$) | Thickness (mm.) | Component | Pickup (percent) | Weight (g./m.$^2$) | Thickness (mm.) |
| Controls: | | | | | | | | |
| I | 120 | 91 | 255 | 1.4 | RFL | 65 | 420 | (1.3) |
| II | 75 | 83 | 1960 | 10.3 | RFL | 65 | 3,240 | (8.4) |
| III Example number 3, Run number 3 | 110 | 92 | 680 | 3.7 | RFL | 65 | 1,120 | (3.2) |
| IV Example number 3, Run number 4 | 45 | 73 | 680 | 3.4 | RFL | 65 | 1,120 | (3.2) |
| V Example number 3, Run number 5 | *40 | 71 | 680 | 3.6 | RFL | 65 | 1,120 | (3.2) |
| VI Example number 3, Run number 7 | 100 | 92 | 680 | 3.6 | RFL | *20 | 820 | (3.1) |
| VII Example number 6 | (¹) | (¹) | (¹) | (¹) | (¹) | (¹) | (¹) | (¹) |
| VIII Example number 6 | (²) | (²) | (²) | (²) | (²) | (²) | (²) | (²) |

¹ Mono-ply of woven sheet.
² Multi-ply of woven sheet.

TABLE V'.—BELT

| | Thickness (mm.) | Weight (g./m.$^2$) | Longitudinal strength-elongation (kg./cm. percent) | Elongation (percent) | Flexibility (10 thousand times) | Metallic tool joining efficiency (percent) | Rubber peel strength (kg./2.5 cm.) | Impact strength (percent) | Fatigue resistance (percent) |
|---|---|---|---|---|---|---|---|---|---|
| Controls: | | | | | | | | | |
| I | 3.6 | 4,270 | 85 x 15.1 | 0.4 | 20< | 54 | 17.8 | | |
| II | 6.6 | 7,090 | 521 x 21.2 | 1.0 | 6 | 42 | 18.5 | | |
| III Example Number 3, Run Number 3 | 4.2 | 4,970 | 235 x 16.1 | 0.4 | 7 | 40 | 16.5 | | |
| IV Example Number 3, Run Number 4 | 4.2 | 4,970 | 128 x 23.4 | 1.4 | 20< | 56 | 18.3 | | |
| V Example Number 3, Run Number 5 | 4.2 | 4,970 | 132 x 26.5 | 2.1 | 18 | 58 | 17.8 | | |
| VI Example Number 3, Run Number 7 | 4.0 | 4,670 | 135 x 18.1 | 0.8 | 1.5 | 35 | 14.4 | | |
| VII Example Number 6 | 4.1 | 4,400 | 207 x 20.6 | 3.1 | 20< | 35 | 15.4 | 38.3 | 89.1 |
| VIII Example Number 6 | 6.0 | 6,680 | 201 x 20.1 | 1.0 | 14 | 30 | 14.2 | 53.1 | 70.5 |

¹ ⅒ of belt strength.

We claim:

1. A conveyor belt formed of a core body and two sheets of rubber cover pressed onto the top and bottom of said core body, said core body being a nonwoven sheet made of webs of stable fibers and impregnated with an adhesive, said nonwoven sheet having a weight of 300 –1,500 b./m.$^2$ and containing no less than 50 wt. percent thereof of said adhesive, the staple fibers constituting said nonwoven sheet being mutually intertwined by needling of said webs, at least 80 percent of said staples fibers being longitudinally oriented by a longitudinal drawing of the needled webs, the needling density of the webs ranging from 50 –250 times/cm.$^2$, and said staple fibers being 40 –120 mm. in length and in a crimped state during the formation of said web.

2. The conveyor belt of claim 1, wherein said nonwoven sheet weighs 300 –1,500 g./m.$^2$ and contains no less than 80 percent by weight thereof of an adhesive agent, at least 85 percent of said staple fibers constituting said nonwoven sheet being longitudinally oriented, the needling density of the webs being 70 –200 times/cm.$^2$ and the length of the staple fibers ranging from 45 –90 mm.

3. The conveyor belt of claim 1, wherein the fiber material forming said nonwoven sheet is selected from the group consisting of polyester, polyvinyl, polypropylene, polyamide and polyacrylic synthetic fibers.

4. The conveyor belt of claim 1, wherein said adhesive is composed of at least one rubber component and at least one fiber-philic component selected from the group consisting of an isocyanate compound, resorcin-formalin resin, epoxy compound, ethylene-urea compound, ethylene-imine compound and phenolic resin.

5. The conveyor belt of claim 4, wherein the fiber-philic component in said adhesive is present in an amount of no more than 25 percent by weight based on the weight of the rubber component.

6. The conveyor belt of claim 4, wherein said adhesive contains a solvent selected from the group consisting of hydrocarbons, benzene, and ketones.

7. The conveyor belt of claim 4, wherein said adhesive has a viscosity not higher than 150 p.s.i.g.

8. The conveyor belt of claim 4, wherein said adhesive has a viscosity not higher than 100 p.s.i.g.

9. A process for the preparation of a conveyor belt formed by pressing rubber covers onto the top and bottom of a core body, which comprises: needling a web of 200–1,000 g./m.² formed of crimped and 40–120 mm. long staple fibers at a needling density of 50–250 times/cm.²; drawing the needled web in its longitudinal direction by at least 50 percent based on the original length to convert the web to a nonwoven sheet; impregnating the nonwoven sheet with an adhesive so as to produce the core body; and pressing rubber covers onto the top and bottom surfaces of said core body.

10. The process of claim 9, wherein the needled web is impregnated with said adhesive before drawing, and drawing of the adhesive-impregnated needled web is conducted before said adhesive is substantially dried or hardened.

11. The process of claim 9, wherein a web of 300–800 g./cm.² formed of 45–90 mm. long staple fibers is needled at a needling density of 70–200 times/cm.², drawn by at least 80 percent, and impregnated with an adhesive to an adhesive pickup of no less than 80 percent by weight 9, on the weight of the nonwoven sheet.

12. The process of claim 9, wherein the fiber material forming the nonwoven sheet is selected from the group consisting of polyester, polyvinyl, polypropylene, polyamide and polyacrylic synthetic fibers.

13. The process of claim 9, wherein said adhesive is composed of at least one rubber component and at least one fiber-philic component selected from the group consisting of an isocyanate compound, resorcin-formaline resin, epoxy compound, ethylene-urea compound, ethylene-imine compound and phenolic resin.

14. The process of claim 13, wherein the fiber-philic component in the adhesive is present in an amount of no more than 25 percent by weight based on the weight of the rubber component.

15. The process of claim 13 wherein the adhesive contains a solvent selected from the group consisting of hydrocarbons, benzene, and ketones.

16. The process of claim 13, wherein said adhesive has a viscosity not higher than 150 p.s.i.g.

17. The process of claim 13, wherein said adhesive has a viscosity not higher than 100 p.s.i.g.

* * * * *

UNITED STATES PATENT OFFICE
CERTIFICATE OF CORRECTION

Patent No. 3,620,897          Dated Novmeber 16, 1971

Inventor(s) Katsukiyo Tanimoto et al.

It is certified that error appears in the above-identified patent and that said Letters Patent are hereby corrected as shown below:

Claim 1, line 5, "b./m.$^2$" should read -- g./m.$^2$ --.

Claim 11, line 5, "9," should read -- based --.

Signed and sealed this 9th day of May 1972.

(SEAL)
Attest:

EDWARD M. FLETCHER, JR.          ROBERT GOTTSCHALK
Attesting Officer                 Commissioner of Patents